(12) United States Patent
Hayashi (10) Patent No.: US 7,286,290 B2
(45) Date of Patent: Oct. 23, 2007

(54) OPTICAL ILLUMINATION APPARATUS

(75) Inventor: Kohtaro Hayashi, Toyonaka (JP)

(73) Assignee: Minolta Co., Ltd., Osaka (JP)

( * ) Notice: Subject to any disclaimer, the term of this patent is extended or adjusted under 35 U.S.C. 154(b) by 114 days.

(21) Appl. No.: 10/844,132

(22) Filed: May 12, 2004

(65) Prior Publication Data

US 2004/0218505 A1 Nov. 4, 2004

Related U.S. Application Data

(60) Division of application No. 10/442,768, filed on May 21, 2003, now abandoned, which is a continuation of application No. 09/836,642, filed on Apr. 17, 2001, now abandoned.

(30) Foreign Application Priority Data

Apr. 21, 2000 (JP) ............................. 2000-120452

(51) Int. Cl.
*G02B 5/30* (2006.01)

(52) U.S. Cl. ...................... 359/502; 359/626; 359/495; 353/20; 362/19; 349/9

(58) Field of Classification Search ...................... None
See application file for complete search history.

(56) References Cited

U.S. PATENT DOCUMENTS

| 5,283,600 A | 2/1994 | Imai .............................. 353/34 |
| 5,626,409 A | 5/1997 | Nakayama et al. ........... 353/31 |
| 5,729,306 A | 3/1998 | Miyake et al. .................. 349/9 |
| 6,005,655 A | 12/1999 | Mushiake et al. ............. 355/31 |
| 6,062,695 A | 5/2000 | Kakuda et al. ................ 353/38 |
| 6,142,633 A | 11/2000 | Takahara et al. .............. 353/20 |
| 6,217,173 B1 | 4/2001 | Huang et al. .................. 353/20 |
| 6,678,078 B1 * | 1/2004 | Popovich et al. .............. 359/15 |
| 2002/0001131 A1 | 1/2002 | Hatanaka et al. ........... 359/485 |

FOREIGN PATENT DOCUMENTS

| JP | 6-289387 A | 10/1994 |
| JP | 7-120753 A | 5/1995 |
| JP | 8-094986 A | 4/1996 |
| JP | 11-052899 A | 2/1999 |
| JP | 2000-321535 A | 11/2000 |

\* cited by examiner

*Primary Examiner*—Arnel Lavarias
*Assistant Examiner*—Derek S. Chapel
(74) *Attorney, Agent, or Firm*—Sidley Austin LLP (57) ABSTRACT

An optical illumination apparatus has a polarization conversion device for converting light from a light source into light polarized uniformly in a predetermined manner and an optical integrator system for illuminating a display panel with the light polarized in the predetermined manner. The polarization conversion device splits the light from the light source into a first light beam and a second light beam in such a way that the first and second light beams are polarized in different manners, and then converts one of the first and second light beams into light polarized in the identical manner as the other light beam. Moreover, the first and second light beams pass through an identical lens cell of a first lens array of the optical integrator system and are imaged on an identical lens cell of a second lens array of the optical integrator system.

19 Claims, 9 Drawing Sheets

OPTICAL ILLUMINATION APPARATUS

RELATED APPLICATIONS

This application is a divisional application of and claims the benefit under 35 U.S.C. § 121 of U.S. application Ser. No. 10/442,768, filed May 21, 2003; abandoned, which application was a continuation of and claims the benefit under 35 U.S.C. § 120 of U.S. patent application Ser. No. 09/836,642, filed Apr. 17, 2001, abandoned, which claimed priority under 35 U.S.C. § 119 from Japanese Application No. 2000-120452, filed in Japan on Apr. 21, 2000, the contents of all of which are incorporated herein by reference.

FIELD OF THE INVENTION

The present invention relates to an optical illumination apparatus for use in an optical display apparatus employing a display panel.

BACKGROUND OF THE INVENTION

Figure 10:
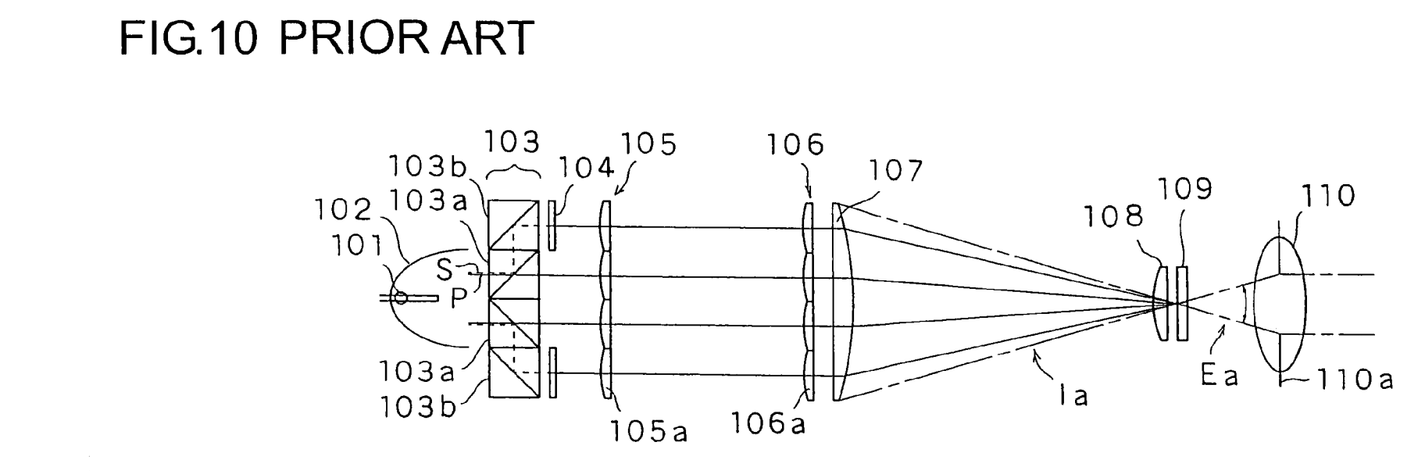
FIG. 10 is a diagram conceptually showing an example of the construction of an optical display apparatus employing a conventional optical illumination apparatus.

Conventionally, as a means of displaying images, projection-type optical display apparatuses such as projectors are known. Such optical display apparatuses require an optical illumination apparatus for efficiently and uniformly illuminating the optical image formed on a display panel, such as a reflective liquid crystal display panel. FIG. 10 is a diagram conceptually showing an example of the construction of an optical display apparatus employing a conventional optical illumination apparatus.

In FIG. 10, reference numeral 101 represents a light source, and reference numeral 102 represents a reflector disposed so as to partially surround the light source 101. A PBS (polarizing beam splitter) prism unit 103 is disposed immediately behind the reflector 102, i.e., on the right side thereof in FIG. 10. The PBS prism unit 103 includes a plurality of PBS prisms arranged parallel to one another. The PBS prism unit 103 splits the light from the light source 101 into two differently polarized types of light. Of the individual PBS prisms 103a and 103b, those which let out S-polarized light as described later have half-wave plates 104 disposed immediately behind them.

Behind the PBS prism unit 103 (i.e., on the right side thereof in FIG. 10) are disposed, in order of arrangement, a first lens array 105, then somewhat away therefrom, a second lens array 106, and a superimposing lens 107 immediately behind it. The first lens array 105 has a plurality of lens cells 105a arranged in a rectangular, grid-like array having an aspect ratio substantially identical to that of a display panel 109 to be described later. Similarly, the second lens array 106 also has a plurality of lens cells 106a arranged in a rectangular, grid-like array. However, the shape of the lens cells 106a of the second lens array 106 is not necessarily geometrically similar to that of the lens cells 105a.

The images from the individual lens cells 105a of the first lens array 105 are, by the second lens array 106 and the superimposing lens 107 disposed immediately behind it, superimposed on one another in the vicinity of the focal point of the superimposing lens 107. The display panel 109 is disposed at the focal point of the superimposing lens 107. The display panel 109 is illuminated in a telecentric fashion by a condenser lens 108 disposed immediately in front of it. The components from the first lens array 105 through the superimposing lens 107 mentioned above together constitute an optical integrator system. It is to be noted that, in all the diagrams referred to in the present specification, irrespective of whether they relate to prior-art examples or to embodiments of the present invention, light beams are represented by their optical axes alone.

The light emitted from the light source 101 is reflected from the reflector 102, and is thereby formed into a substantially parallel beam and directed to the PBS prisms 103a of the PBS prism unit 103. Here, P-polarized light, indicated by solid lines P, is transmitted straight through the PBS prisms 103a. On the other hand, S-polarized light, indicated by broken lines S, is reflected inside the PBS prisms 103a so as to be directed to the outwardly contiguous PBS prisms 103b, and is then reflected again inside the PBS prisms 103b so as to exit therefrom, still as S-polarized light. That is, by the PBS prism unit 103, the light from the light source 101 is split into two differently polarized types of light in the direction of the longer sides of the display panel 109, i.e., in a vertical direction along the plane of the figure.

The S-polarized light exiting from the PBS prisms 103b is transmitted through the half-wave plates 104 disposed immediately behind the PBS prisms 103b and is thereby converted into P-polarized light. That is, a portion of the light from the light source 101 has its polarization converted first by the PBS prisms 103b of the PBS prism unit 103 and then by the half-wave plates 104, and eventually comes out as uniformly P-polarized light. This arrangement constitutes a polarization conversion device. Here, the type of light into which the light from the light source 101 is converted does not necessarily have to be P-polarized light, but can be of other polarizations. The arrangement described thus far, starting with the light source 101 and ending immediately in front of the display panel 109, constitutes an optical illumination apparatus.

The light thus converted into uniformly P-polarized light is then directed through the above-mentioned optical integrator system to the display panel 109. The display panel 109 modulates, pixel by pixel, the light it is illuminated with according to the display data fed thereto, and emits the modulated light. The light thus emitted then enters an optical projection system 110. The display data presented on the display panel 109 is projected, as an image, onto a screen (not shown) through this optical projection system 110. Reference numeral 110a represents an aperture stop disposed in the optical projection system 110.

Figure 11:
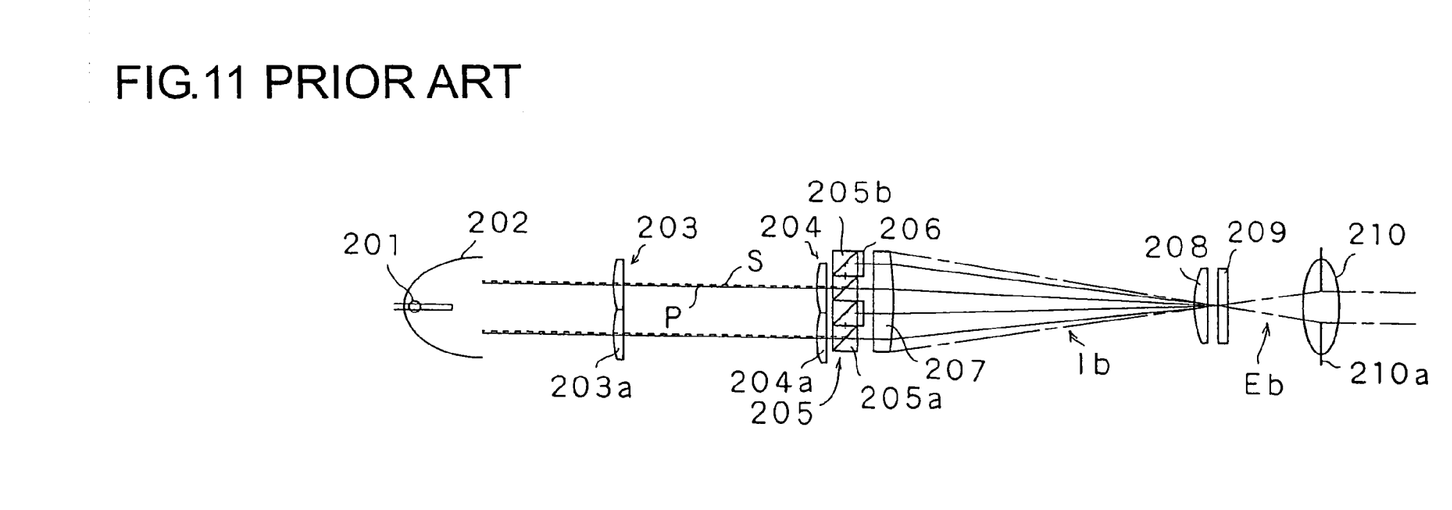
FIG. 11 is a diagram conceptually showing another example of the construction of an optical display apparatus employing a conventional optical illumination apparatus.

FIG. 11 is a diagram conceptually showing another example of the construction of an optical display apparatus employing a conventional optical illumination apparatus. In this figure, reference numeral 201 represents a light source, and reference numeral 202 represents a reflector disposed so as to partially surround the light source 201. Behind the reflector 202 (i.e., on the right side thereof in FIG. 11) are disposed, in order of arrangement, a first lens array 203 and, then somewhat away therefrom, a second lens array 204. The first lens array 203 has a plurality of lens cells 203a arranged in a rectangular, grid-like array having an aspect ratio substantially identical to that of a display panel 209 to be described later. Similarly, the second lens array 204 also has a plurality of lens cells 204a arranged in a rectangular, grid-like array. However, the shape of the lens cells 204a of the second lens array 204 is not necessarily geometrically similar to that of the lens cells 203a.

A PBS (polarizing beam splitter) prism array 205 is disposed immediately behind the second lens array 204. The PBS prism array 205 includes a plurality of PBS prisms arranged in an array. The PBS prism array 205 splits the light from the light source 201 into two differently polarized types of light. Of the individual PBS prisms 205a and 205b, those which let out S-polarized light as described later have half-wave plates 206 disposed immediately behind them.

A superimposing lens 207 is disposed behind the PBS prism array 205. The images of the individual lens cells 203a of the first lens array 203 are, by the second lens array 204 and the superimposing lens 207, superimposed on one another in the vicinity of the focal point of the superimposing lens 207. The display panel 209 is disposed at the focal point of the superimposing lens 207. The display panel 209 is illuminated in a telecentric fashion by a condenser lens 208 disposed immediately in front of it. The first lens array 203, the second lens array 204, and the superimposing lens 207 mentioned above together constitute an optical integrator system.

The light emitted from the light source 201 is reflected from the reflector 202, and is thereby formed into a substantially parallel beam and passed through the first lens array 203 and the second lens array 204, so that the light exiting from the individual lens cells 204a of the second lens array 204 enters corresponding ones of the PBS prisms 205a of the PBS prism array 205. Here, P-polarized light, indicated by solid lines P, is transmitted straight through the PBS prisms 205a. On the other hand, S-polarized light, indicated by broken lines S, is reflected inside the PBS prisms 205a so as to be directed to the contiguous PBS prisms 205b, and is then reflected again inside the PBS prisms 205b so as to exit therefrom, still as S-polarized light.

The S-polarized light exiting from the PBS prisms 205b is then transmitted through the half-wave plates 206 disposed immediately behind the PBS prisms 205b and is thereby converted into P-polarized light. That is, a portion of the light from the light source 201 has its polarization converted first by the PBS prisms 205b of the PBS prism array 205 and then by the half-wave plates 206, and eventually comes out as uniformly P-polarized light. This arrangement constitutes a polarization conversion device. Here, the type of light into which the light from the light source 201 is converted does not necessarily have to be P-polarized light, but can be of other polarizations. The arrangement described thus far, starting with the light source 201 and ending immediately in front of the display panel 209, constitutes an optical illumination apparatus.

The light thus converted into uniformly P-polarized light is then directed through the superimposing lens 207 to the display panel 209. The display panel 209 modulates, pixel by pixel, the light it is illuminated with according to the display data fed thereto, and emits the modulated light. The light thus emitted then enters an optical projection system 210. The display data presented on the display panel 209 is projected, as an image, onto a screen (not shown) through this optical projection system 210. Reference numeral 210a represents an aperture stop disposed in the optical projection system 210.

In the conventional optical illumination apparatus constructed as shown in FIG. 10, polarization conversion is performed immediately behind the light source 101. Therefore, the light emitted from the light source 101 and then reflected from the reflector 102 has its beam diameter enlarged to about twice its original beam diameter as a result of the polarization conversion. This diminishes the f-number of the illumination light Ia that strikes the display panel 109 and thus diminishes the f-number of the projection light Ea that emanates from the display panel 109, making the burden on the optical projection system 110 heavier.

On the other hand, in the conventional optical illumination apparatus constructed as shown in FIG. 11, the light emitted from the light source 201 and then reflected from the reflector 202 experiences no enlargement of its beam diameter. Therefore, no diminishing occurs in the f-number of the illumination light Ib that strikes the display panel 209 nor in the f-number of the projection light Eb that emanates from the display panel 209. Thus, no extra burden is placed on the optical projection system 210. However, the light from the light source 201 is not converted into uniformly polarized light until it has passed through the second lens array 204. Therefore, in this optical illumination apparatus, no space is available for inserting a polarization-dependent color switching device such as those used in the embodiments of the present invention to be described later. That is, this optical illumination apparatus does not permit a so-called color sequential illumination method using such a color switching device.

SUMMARY OF THE INVENTION

An object of the present invention is to provide an optical illumination apparatus that causes no diminishing in the f-number of illumination light so as to keep the burden on an optical projection system minimal and that allows insertion of a polarization-dependent color switching device.

To achieve the above object, according to one aspect of the present invention, an optical illumination apparatus is provided, including a polarization conversion device for converting light from a light source into light uniformly polarized in a predetermined manner and an optical integrator system for illuminating a display panel with the light polarized in the predetermined manner. The optical integrator includes a first lens array having a first lens cell, and a second lens array having a second lens cell. The polarization conversion device splits the light from the light source into a first light beam and a second light beam in such a way that the first and second light beams are polarized in different manners, and then converts one of the first and second light beams into light polarized in an identical manner as the other of the first and second light beams. The first and second light beams pass through the first lens cell of the first lens array and are imaged on the second lens cell of the second lens array.

BRIEF DESCRIPTION OF THE DRAWINGS

This and other objects and features of the present invention will become clear from the following description, taken in conjunction with the preferred embodiments with reference to the accompanying drawings, in which.

DETAILED DESCRIPTION OF THE PREFERRED EMBODIMENTS

Figure 1:
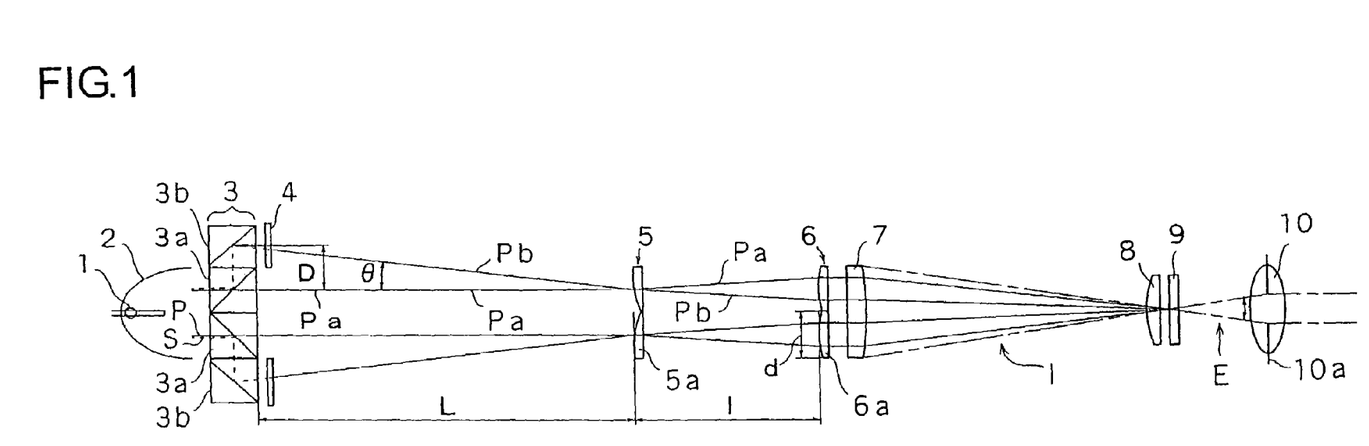
FIG. 1 is a diagram conceptually showing an example of the construction of an optical display apparatus employing an optical illumination apparatus embodying the invention.

Hereinafter, embodiments of the present invention will be described with reference to the drawings. FIG. 1 is a diagram conceptually showing an example of the construction of an optical display apparatus employing an optical illumination apparatus embodying the invention. In FIG. 1, reference numeral 1 represents a light source, and reference numeral 2 represents a reflector disposed so as to partially surround the light source 1. A PBS (polarizing beam splitter) prism unit 3 is disposed immediately behind the reflector 2, i.e., on the right side thereof in FIG. 1. The PBS prism unit 3 includes a plurality of PBS prisms arranged parallel to one another. The PBS prism unit 3 splits the light from the light source 1 into two differently polarized types of light. Of the individual PBS prisms 3a and 3b, those which let out S-polarized light have half-wave plates 4 disposed immediately behind them.

Behind the PBS prism unit 3 (i.e., on the right side thereof in FIG. 1) are disposed, in order of arrangement, a first lens array 5, then somewhat away therefrom, a second lens array 6, and a superimposing lens 7 immediately behind the second lens array 6. The first lens array 5 has a plurality of lens cells 5a arranged in a rectangular, grid-like array, having an aspect ratio substantially identical to that of a display panel 9 to be described later. Similarly, the second lens array 6 also has a plurality of lens cells 6a arranged in a rectangular, grid-like array. However, the shape of the lens cells 6a of the second lens array 6 is not necessarily geometrically similar to that of the lens cells 5a.

The images from the individual lens cells 5a of the first lens array 5 are, by the second lens array 6 and the superimposing lens 7 disposed immediately behind it, superimposed on one another in the vicinity of the focal point of the superimposing lens 7. The display panel 9 is disposed at the focal point of the superimposing lens 7. Here, the display panel 9 is of a single-panel type that achieves color display with a single display panel. Moreover, the display panel 9 is illuminated in a telecentric fashion by a condenser lens 8 disposed immediately in front of it. The components from the first lens array 5 through the superimposing lens 7 constitute an optical integrator system.

The light emitted from the light source 1 is reflected from the reflector 2, and is thereby formed into a substantially parallel beam and directed to the PBS prisms 3a of the PBS prism unit 3. Here, P-polarized light, indicated by solid lines P, is transmitted straight through the PBS prisms 3a On the other hand, S-polarized light, indicated by broken lines S, is reflected inside the PBS prisms 3a so as to be directed to the outwardly contiguous PBS prisms 3b, and is then reflected again inside the PBS prisms 3b so as to exit therefrom, still as S-polarized light. That is, by the PBS prism unit 3, the light from the light source 1 is split into two differently polarized types of light in the direction of the longer sides of the display panel 9, i.e., in a vertical direction along the plane of the figure.

The S-polarized light exiting from the PBS prisms 3b is transmitted through the half-wave plates 4 disposed immediately behind the PBS prisms 3b and is thereby converted into P-polarized light. That is, a portion of the light from the light source 1 has its polarization converted first by the PBS prisms 3b of the PBS prism unit 3 and then by the half-wave plates 4, and eventually comes out as uniformly P-polarized light. This arrangement constitutes a polarization conversion device. Here, the type of light into which the light from the light source 1 is converted does not necessarily have to be P-polarized light, but can be of other polarizations. The arrangement described thus far, starting with the light source 1 and ending immediately in front of the display panel 9, constitutes an optical illumination apparatus.

The light thus converted into uniformly P-polarized light is then directed through the above-mentioned optical integrator system to the display panel 9. The display panel 9 modulates, pixel by pixel, the light it is illuminated with according to the display data fed thereto, and emits the modulated light. The light thus emitted then enters an optical projection system 10. The display data presented on the display panel 9 is projected, as an image, onto a screen (not shown) through this optical projection system 10. Reference numeral 10a represents an aperture stop disposed in the optical projection system 10.

Here, the S-polarized light indicated by the broken lines S is, when reflected inside the PBS prisms 3b, reflected inwardly with respect to the optical illumination apparatus itself. That is, of the two types of differently polarized light split by the PBS prism unit 3, the light Pb that is originally S-polarized and then converted by the half-wave plates 4 into P-polarized light travels along somewhat inwardly inclined paths and then passes through the same lens cells 5a of the first lens array 5 as does the light Pa that is P-polarized from the beginning.

The distance between the PBS prism unit 3 and the first lens array 5 is represented by L. This is the space where a color switching device, to be described later, is disposed. The lens cells 5a are shaped like wedges and are arranged such that the vertices of their curved surfaces are outwardly decentered. Thus, the two types of light Pa and Pb, as they pass through the lens cells 5a, are individually refracted so as to form two light source images on identical lens cells 6a of the second lens array 6. The polarization conversion device mentioned above splits the light from the light source 1 into two groups of light in such a way that the two groups of light travel in horizontally symmetric directions with respect to the direction in which the projected image is displayed. Accordingly, the lens cells 5a of the first lens array 5 are decentered in horizontally symmetric directions with respect to the direction in which the projected image is displayed.

In the arrangement described above according to the present invention, polarization conversion is performed immediately behind the light source 1. Therefore, the light emitted from the light source 1 and then reflected from the reflector 2 has its beam diameter enlarged to about twice its original beam diameter as a result of polarization conversion. In this respect, this arrangement is the same as that of the conventional optical illumination apparatus shown in FIG. 10. However, the arrangement according to the present invention is so constructed that, as shown in FIG. 1, the two types of light, although split so as to be differently polarized, pass through identical lens cells 5a of the first lens array 5 and form two light source images on identical cells 6a of the second lens array 6. Therefore, no diminishing occurs in the f-number of the illumination light 1 that strikes the display panel 9 nor in the f-number of the projection light E that emanates from the display panel 9. Thus, no extra burden is placed on the optical projection system 10.

Here, as shown in FIG. 1, let the distance between the beam centers of the P-polarized and the S-polarized light split by the PBS prism unit 3 be D, and the angle between the directions in which the beam centers of those two types of light point, i.e., the angle between Pa and Pb, be θ. Moreover, let the optical distance between the first lens array 5 and the second lens array 6 be l, and the size of each lens cell 6a of the second lens array 6, along its longer sides, be d. Then, it is preferable that the following conditional formula be fulfilled:

$$0.3 < l \cdot \tan \theta / d < 0.75$$

The optimum value of this conditional formula is 0.5, because then the distance between the two light-source images formed on an identical cell 6a of the second lens array 6 is equal to 2/d, and thus the two images are formed in the best-balanced position on the lens cell 6a.

A color switching device, to be described later, exhibits dependence on polarization. In view of this, one might consider that, in the conventional optical illumination apparatus constructed as shown in FIG. 11, it is possible to dispose the color switching device between the superimposing lens 207 and the condenser lens 208, where the illumination light Ib is uniformly polarized. However, if the color switching device is disposed in this position, the color switching device receives incident rays from so wide a range of angles that its dependence on angle of incidence exerts an undesirable effect. Thus, this position is unfit for the placement of the color switching device.

Specifically, although the f-number is not small, the illumination light Ib is a divergent beam that fans out in a range of angles of about ±10 degrees, thus causing the undesirable effect mentioned above. In contrast, according to the present invention, a color switching device is disposed between the PBS prism unit 3 and the first lens array 5, where the previously-mentioned angle θ, which corresponds to the range of angles of incident rays, is 4 to 5 degrees at the very most. Therefore, the effect resulting from the dependence of the color switching device on the angle of incidence is negligible.

Hereinafter, optical illumination apparatuses embodying the present invention and employing various types of color switching device will be described. An optical display apparatus of a single-panel type that achieves color, i.e., RGB, display with a single display panel adopts a so-called color sequential (color time-divisional) illumination method. More specifically, in such a case, it has been customary to adopt, for example, a color wheel time-divisional method.

The color wheel used in such a method has the shape of a disk, and has three color filters, which respectively transmit R (red), G (green), and B (blue) colors. The filters are arranged in three regions around a rotational axis that runs through the center of the color wheel. As those color filters rotate at high speed about the axis of rotation, the illumination light passing therethrough has its color switched at high speed from one color to another.

However, a color wheel time-divisional method involves mechanical rotation of a color wheel and is thus not entirely satisfactory in terms of reliability and operating life. For this reason, according to the present invention, the switching of the color of illumination light from one color to another is achieved electrically by the use of a color switching device such as those used in the individual embodiments of the invention described below.

Figure 2:
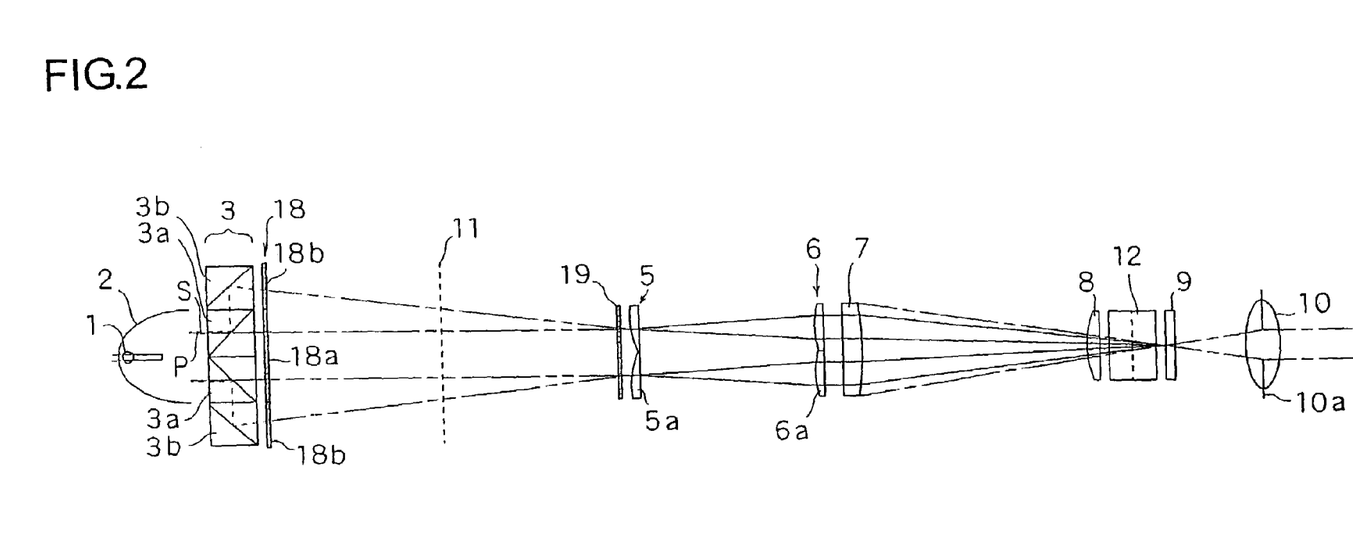
FIG. 2 is a diagram conceptually showing the construction of an optical display apparatus employing an optical illumination apparatus of a first embodiment of the invention.

FIG. 2 is a diagram conceptually showing the construction of an optical display apparatus employing an optical illumination apparatus of a first embodiment of the invention. In FIG. 2, reference numeral 1 represents a light source, and reference numeral 2 represents a reflector disposed so as to partially surround the light source 1. A PBS (polarizing beam splitter) prism unit 3 is disposed immediately behind the reflector 2, i.e., on the right side thereof in FIG. 2. The PBS prism unit 3 includes a plurality of PBS prisms arranged parallel to one another. The PBS prism unit 3 splits the light from the light source 1 into two differently polarized types of light.

Quarter-wave plates 18 are disposed immediately behind the PBS prism unit 3. More specifically, of the individual PBS prisms 3a and 3b of the PBS prism unit 3, those PBS prisms 3a which let out P-polarized light as described later have quarter-wave plates 18a disposed immediately behind them that have their principal axes oriented at −45 degrees, and those PBS prisms 3b which let out S-polarized light have quarter-wave plates 18b disposed immediately behind them that have their principal axes oriented at +45 degrees.

Behind the quarter-wave plates 18 (i.e., on the right side thereof in FIG. 2) are disposed, in order of arrangement, a cholesteric liquid crystal device 11, a quarter-wave plate 19, then a first lens array 5 immediately behind it, then somewhat away therefrom, a second lens array 6, and a superimposing lens 7 immediately behind it. The first lens array 5 has a plurality of lens cells 5a arranged in a rectangular, grid-like array having an aspect ratio substantially identical to that of a display panel 9 to be described later. Similarly, the second lens array 6 also has a plurality of lens cells 6a arranged in a rectangular, grid-like array. However, the shape of the lens cells 6a is not necessarily geometrically similar to that of the lens cells 5a.

The cholesteric liquid crystal device 11 is one type of color switching device that electrically switches the color of illumination light on a time-divisional basis from one color to another among R, G, and B colors. How this is achieved will be described in detail later. The images from the individual lens cells 5a of the first lens array 5 are, by the second lens array 6 and the superimposing lens 7 disposed immediately behind it, superimposed on one another in the vicinity of the focal point of the superimposing lens 7.

The components from the first lens array 5 through the superimposing lens 7 constitute an optical integrator system. The display panel 9 is disposed at the focal point of the superimposing lens 7. The display panel 9 is illuminated in a telecentric fashion by a condenser lens 8 disposed immediately in front of it. A PBS prism 12 is disposed between the condenser lens 8 and the display panel 9. Illumination light from the optical illumination apparatus is converted into projection light by the display panel 9 and transmitted, via the PBS prism 12, to the optical projection system 10. Projection light is considered to include the image information from the display panel 9.

The light emitted from the light source 1 is reflected from the reflector 2, and is thereby formed into a substantially parallel beam and directed to the PBS prisms 3a of the PBS prism unit 3. Here, P-polarized light, indicated by solid lines P, is transmitted straight through the PBS prisms 3a. On the other hand, S-polarized light, indicated by broken lines S, is reflected inside the PBS prisms 3a so as to be directed to the outwardly contiguous PBS prisms 3b, and is then reflected again inside the PBS prisms 3b so as to exit therefrom, still as S-polarized light. That is, by the PBS prism unit 3, the light from the light source 1 is split into two differently polarized types of light in the direction of the longer sides of the display panel 9, i.e., in a vertical direction along the plane of the figure.

The P-polarized light exiting from the PBS prisms 3a is converted into right-handed circularly polarized light by being transmitted through the quarter-wave plates 18a disposed immediately behind the PBS prisms 3a. Similarly, the S-polarized light exiting from the PBS prisms 3b is also converted into right-handed circularly polarized light by being transmitted through the quarter-wave plates 18b disposed immediately behind the PBS prisms 3b. That is, the light from the light source 1 has its polarization converted first by the PBS prism unit 3 and then by the quarter-wave plates 18, and eventually comes out as uniformly right-handed circularly polarized light. This arrangement constitutes a polarization conversion device. Here, the type of light into which the light from the light source 1 is converted does not necessarily have to be right-handed circularly polarized light, but can be of other polarizations. The arrangement described thus far, starting with the light source 1 and ending immediately in front of the display panel 9, constitutes an optical illumination apparatus.

The light thus converted into uniformly right-handed circularly polarized light has its color switched by the cholesteric liquid crystal device 11, is converted into linearly polarized light by the quarter-wave plate 19, passes through the above-mentioned optical integrator system, and eventually strikes the display panel 9. The display panel 9 modulates, pixel by pixel, the light it is illuminated with according to the display data of R, G, and B colors fed thereto, and emits the modulated light. The light thus emitted then enters an optical projection system 10. The display data presented on the display panel 9 is projected, as an image, onto a screen (not shown) through this optical projection system 10. Reference numeral 10a represents an aperture stop disposed in the optical projection system 10.

Figure 3:
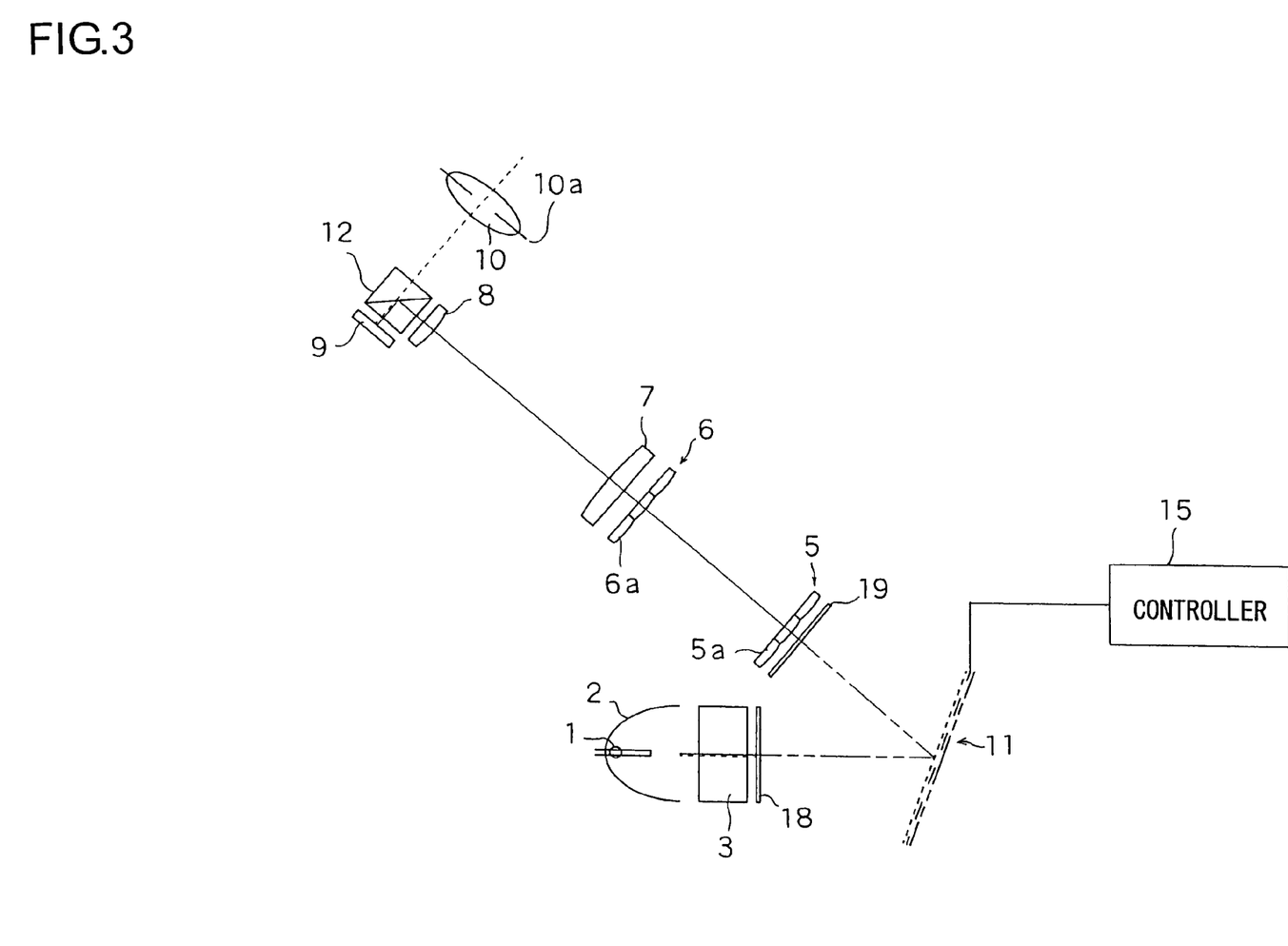
FIG. 3 is a diagram schematically showing an example of a practical construction of the optical display apparatus shown in FIG. 2.

FIG. 3 is a diagram schematically showing an example of a practical construction of the optical display apparatus shown in FIG. 2. While FIG. 2 illustrates a conceptual view wherein the optical system is formed along a straight line, an optical axis of the optical system is preferably bent at a reflecting surface as shown in FIG. 3.

With reference to FIG. 3, the paths of rays in this embodiment will be described once again below. The light emitted from the light source 1 is reflected from the reflector 2, and is thereby formed into a substantially parallel beam and directed to the PBS prism unit 3. The light has its polarization converted by this PBS prism unit 3 and the quarter-wave plates 18 disposed immediately behind it, and eventually comes out as uniformly right-handed circularly polarized light. The light thus converted into uniformly right-handed circularly polarized light then strikes the surface of the cholesteric liquid crystal device 11.

The cholesteric liquid crystal device 11 is composed of, for example, a total of three layers of cholesteric liquid crystal elements that are laid over one another, one layer for each of R, G, and B colors. These cholesteric liquid crystal elements exhibit dependence on polarization; that is, they reflect only right-handed circularly polarized light. Here, the individual cholesteric liquid crystal elements are driven by a controller 15, shown as a block in FIG. 3, on a color-sequential basis in such a way as to be turned on and off one after another at a high speed. As a result, light of R, G, and B colors, which are contained in the white light from the light source, is reflected one after another on a time-divisional basis. The light of the colors that are not reflected is transmitted through the cholesteric liquid crystal device 11. An example of the structure of each cholesteric liquid crystal element will be described later.

The light exiting from the cholesteric liquid crystal device 11 after having its color switched is still right-handed circularly polarized light. The quarter-wave plate 19 then converts the light into linearly polarized light, for example, S-polarized light. The light then passes through the above-mentioned optical integrator system, enters the PBS prism 12, and is then reflected inside it so as to strike the display panel 9. The display panel 9 is realized with, for example, a reflective liquid crystal display panel. The display panel 9 reflects, pixel by pixel, the light it is illuminated with by rotating (when "on") or not rotating (when "off") the polarization plane of the light according to the display data of R, G, and B colors fed thereto.

Here, the light reflected by the "off" pixels returns to the PBS prism 12, and, since this light is S-polarized light, it is reflected from the PBS prism 12 so as to be directed back to the light source 1. On the other hand, the light reflected by the "on" pixels, which has thereby been converted into P-polarized light, is transmitted through the PBS prism 12 so as to reach the optical projection system 10. The display data presented on the display panel 9 is projected, as an image, onto a screen (not shown) through this optical projection system 10.

Figure 4A:
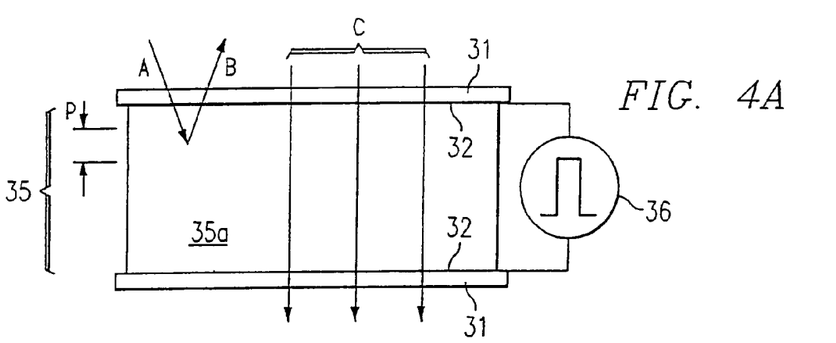
FIGS. 4A and 4B are sectional views schematically showing the structure of a cholesteric liquid crystal element.
Figure 4B:
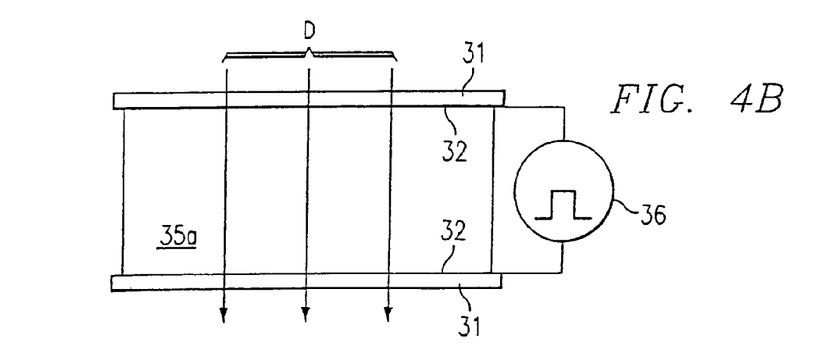

FIGS. 4A and 4B are sectional views schematically showing the structure of each cholesteric liquid crystal element. As shown in these figures, the cholesteric liquid crystal element has cholesteric liquid crystal material 35 sandwiched between ITO films (transparent electrodes) 32 formed over the inner surfaces of a pair of glass substrates (or transparent film substrates) 31, which are arranged so as to face each other. When a high voltage pulse from a voltage pulse source 36 is applied between the ITO films 32, as shown in FIG. 4A, the liquid crystal molecules 35a are brought into a so-called planar orientation and thus into an opaque state. Here, let the so-called twist pitch of the liquid crystal molecules 35a be p, and let the average refractive index of the cholesteric liquid crystal 35 be $n_a$, then the wavelength of the light reflected is given by $\lambda = n_a p$.

As shown in FIG. 4A, the light incident on the cholesteric liquid crystal 35 is indicated by arrow A. In the opaque state, light of a particular wavelength is reflected as indicated by arrow B, and light of other wavelengths is transmitted as indicated by arrows C. In contrast, when a lower voltage pulse from the pulse voltage source 36 is applied between the ITO films 32 as shown in FIG. 4B, the liquid crystal molecules 35a are brought into a so-called focal conic orientation and thus into a transparent state. In this state, all the light incident on the cholesteric liquid crystal 35 is transmitted, as indicated by arrows D.

Thus, by switching the voltage of the pulse applied to the ITO films 32 between a high voltage pulse and a low voltage pulse, it is possible to switch the cholesteric liquid crystal 35 between an opaque state and a transparent state at high speed. That is, by preparing different types of cholesteric liquid crystal materials 35 that act on light of different wavelength ranges, for example the wavelength ranges of R, G, and B colors, and laying cholesteric liquid crystal elements having such different types of cholesteric liquid crystal one over another, it is possible, as described above, to reflect light of R, G, and B colors one after another on a time-divisional basis by switching on and off the individual cholesteric liquid crystal elements one after another at high speed through pulse control.

Figure 5:
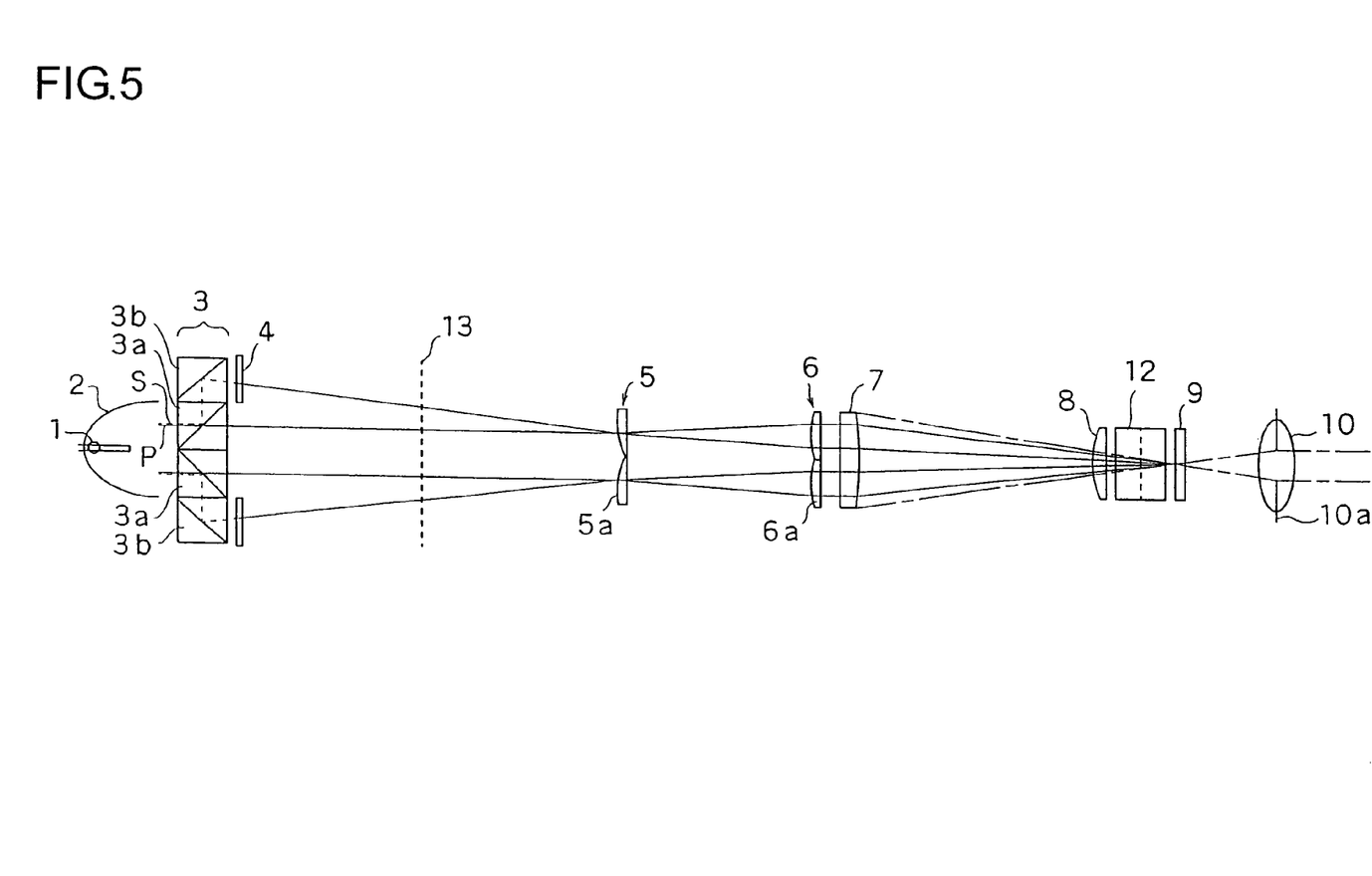
FIG. 5 is a diagram conceptually showing the construction of an optical display apparatus employing an optical illumination apparatus of a second embodiment of the invention.

FIG. 5 is a diagram conceptually showing the construction of an optical display apparatus employing an optical illumination apparatus of a second embodiment of the invention. In FIG. 5, reference numeral 1 represents a light source, and reference numeral 2 represents a reflector disposed so as to partially surround the light source 1. A PBS (polarizing beam splitter) prism unit 3 is disposed immediately behind the reflector 2, i.e., on the right side thereof in FIG. 5. The PBS prism unit 3 includes a plurality of PBS prisms arranged parallel to one another. The PBS prism unit 3 splits the light from the light source 1 into two differently polarized types of light. Of the individual PBS prisms 3a and 3b, those which let out P-polarized light have half-wave plates 4 disposed immediately behind them.

Behind the PBS prism unit 3 (i.e., on the right side thereof in FIG. 5) are disposed, in order of arrangement, a liquid crystal hologram device 13, a first lens array 5, a second lens array 6, and a superimposing lens 7 immediately behind it. The first lens array 5 has a plurality of lens cells 5a arranged in a rectangular, grid-like array, having an aspect ratio substantially identical to that of a display panel 9 to be described later. Similarly, the second lens array 6 also has a plurality of lens cells 6a arranged in a rectangular, grid-like array. However, the shape of the lens cells 6a of the second lens array 6 is not necessarily geometrically similar to that of the lens cells 5a.

The liquid crystal hologram device 13 is one type of a color switching device that electrically switches the color of illumination light on a time-divisional basis from one color to another among R, G, and B colors. How this is achieved will be described in detail later. The images from the individual lens cells 5a of the first lens array 5 are, by the second lens array 6 and the superimposing lens 7 disposed immediately behind it, superimposed on one another in the vicinity of the focal point of the superimposing lens 7.

The components from the first lens array 5 through the superimposing lens 7 constitute an optical integrator system. The display panel 9 is disposed at the focal point of the superimposing lens 7. The display panel 9 is illuminated in a telecentric fashion by a condenser lens 8 disposed immediately in front of it. A PBS prism 12 is disposed between the condenser lens 8 and the display panel 9. Illumination light from the optical illumination apparatus is converted into projection light by the display panel 9 and transmitted, via the PBS prism 12, to the optical projection system 10. Projection light is considered to include the image information from the display panel 9.

The light emitted from the light source 1 is reflected from the reflector 2, and is thereby formed into a substantially parallel beam and directed to the PBS prisms 3a of the PBS prism unit 3. Here, S-polarized light, indicated by solid lines S, is transmitted straight through the PBS prisms 3a. On the other hand, P-polarized light, indicated by broken lines P, is reflected inside the PBS prisms 3a so as to be directed to the outwardly contiguous PBS prisms 3b, and is then reflected again inside the PBS prisms 3b so as to exit therefrom still as P-polarized light. That is, by the PBS prism unit 3, the light from the light source 1 is split into two differently polarized types of light in the direction of the longer sides of the display panel 9, i.e., in a vertical direction along the plane of the figure.

The P-polarized light exiting from the PBS prisms 3b is converted into S-polarized light by being transmitted through the half-wave plates 4 disposed immediately behind the PBS prisms 3b. That is, a portion of the light from the light source 1 has its polarization converted first by the PBS prism unit 3, and then by the half-wave plates 4, and eventually comes out as uniformly S-polarized light. This arrangement constitutes a polarization conversion device. Here, the type of light into which the light from the light source 1 is converted does not necessarily have to be S-polarized light, but can be of other polarizations. The arrangement described thus far, starting with the light source 1 and ending immediately in front of the display panel 9, constitutes an optical illumination apparatus.

The light thus converted into uniformly S-polarized light has its color switched by the liquid crystal hologram device 13, passes through the above-mentioned optical integrator system, and eventually strikes the display panel 9. The display panel 9 modulates, pixel by pixel, the light it is illuminated with according to the display data of R, G, and B colors fed thereto, and emits the modulated light. The light thus emitted then enters an optical projection system 10. The display data presented on the display panel 9 is projected, as an image, onto a screen (not shown) through this optical projection system 10. Reference numeral 10a represents an aperture stop disposed in the optical projection system 10.

Figure 6:
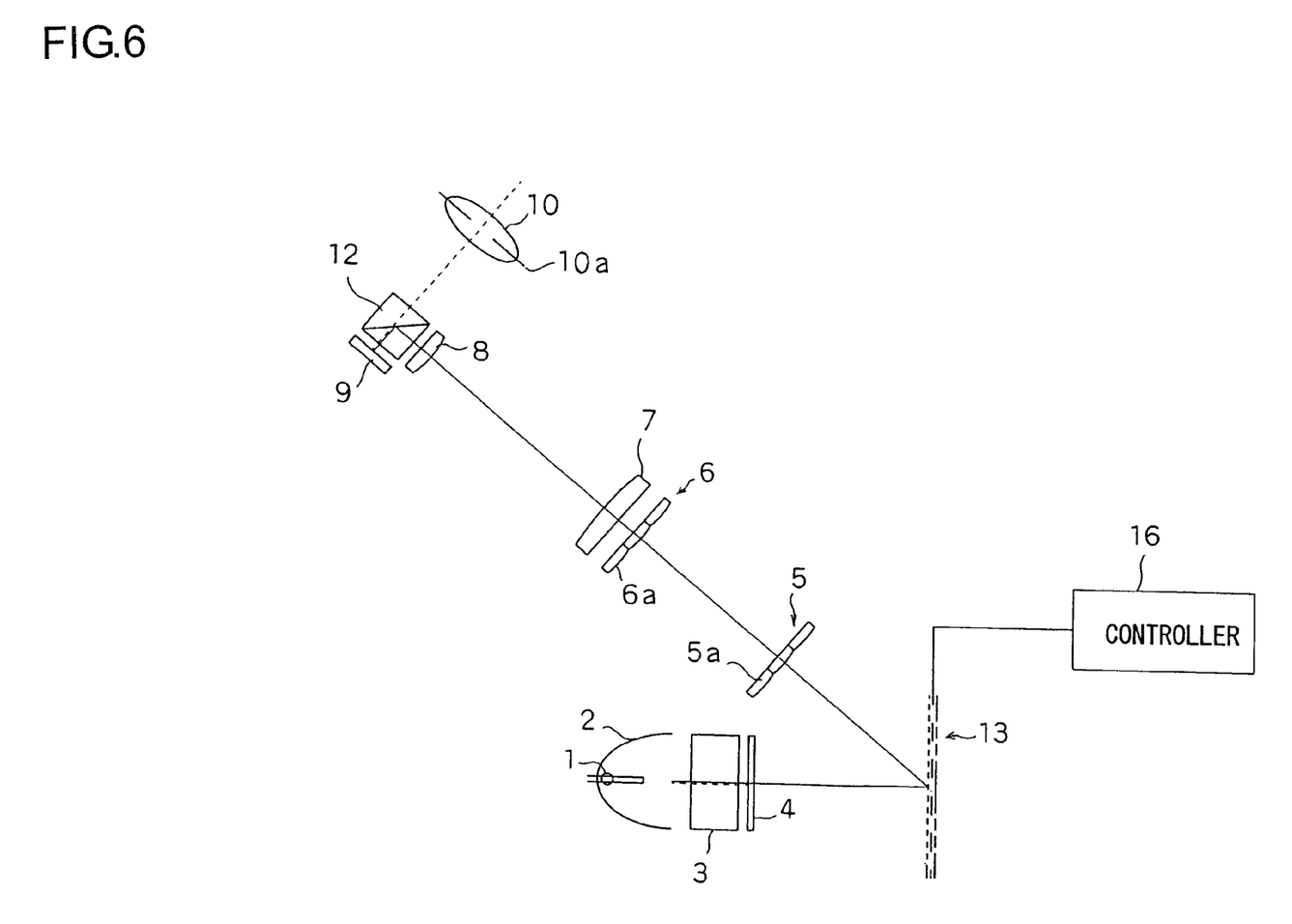
FIG. 6 is a diagram schematically showing an example of a practical construction of the optical display apparatus shown in FIG. 5.

FIG. 6 is a diagram schematically showing an example of a practical construction of the optical display apparatus shown in FIG. 5. While FIG. 5 illustrates a conceptual view wherein the optical system is formed along a straight line, an optical axis of the optical system is preferably bent at a reflecting surface as shown in FIG. 6.

With reference to FIG. 6, the paths of rays in this embodiment will be described once again below. The light emitted from the light source 1 is reflected from the reflector 2, and is thereby formed into a substantially parallel beam and directed to the PBS prism unit 3. The light has its polarization converted by this PBS prism unit 3 and the half-wave plates 4 disposed immediately behind it, and eventually comes out as uniformly S-polarized light. The light thus converted into uniformly S-polarized light then strikes the surface of the liquid crystal hologram device 13 from a direction substantially perpendicular thereto.

The liquid crystal hologram device 13 is composed of, for example, a total of three layers of liquid crystal hologram elements that are laid over one another, one layer for each of R, G, and B colors. These liquid crystal hologram elements exhibit dependence on polarization and on the angle of incidence. Here, the individual liquid crystal hologram elements are driven by a controller 16, shown as a block in FIG. 6, on a color-sequential basis in such a way as to be turned on and off one after another at a high speed. As a result, light of R, G, and B colors, which are contained in the white light from the light source 1 is reflected and diffracted one after another on a time-divisional basis and exits from the liquid crystal hologram device 13 in a direction oblique to its surface. The light of the colors that have not been reflected and diffracted is transmitted through the liquid crystal hologram device 13. An example of the structure of each liquid crystal hologram element will be described later.

The light exiting from the liquid crystal hologram device 13 after having its color switched passes through the above-mentioned optical integrator system, then enters, as S-polarized light, the PBS prism 12, and is then reflected inside it so as to strike the display panel 9. The display panel 9 is realized with, for example, a reflective liquid crystal display panel. The display panel 9 reflects, pixel by pixel, the light it is illuminated with by rotating (when "on") or not rotating (when "off") the polarization plane of the light according to the display data of R, G, and B colors fed thereto.

Here, the light reflected by the "off" pixels returns to the PBS prism 12 and, since this light is S-polarized light, it is reflected from the PBS prism 12 so as to be directed back to the light source. On the other hand, the light reflected by the "on" pixels, which has thereby been converted into P-polarized light, is transmitted through the PBS prism 12 so as to reach the optical projection system 10. The display data presented on the display panel 9 is projected, as an image, onto a screen (not shown) through this optical projection system 10.

Figure 7:
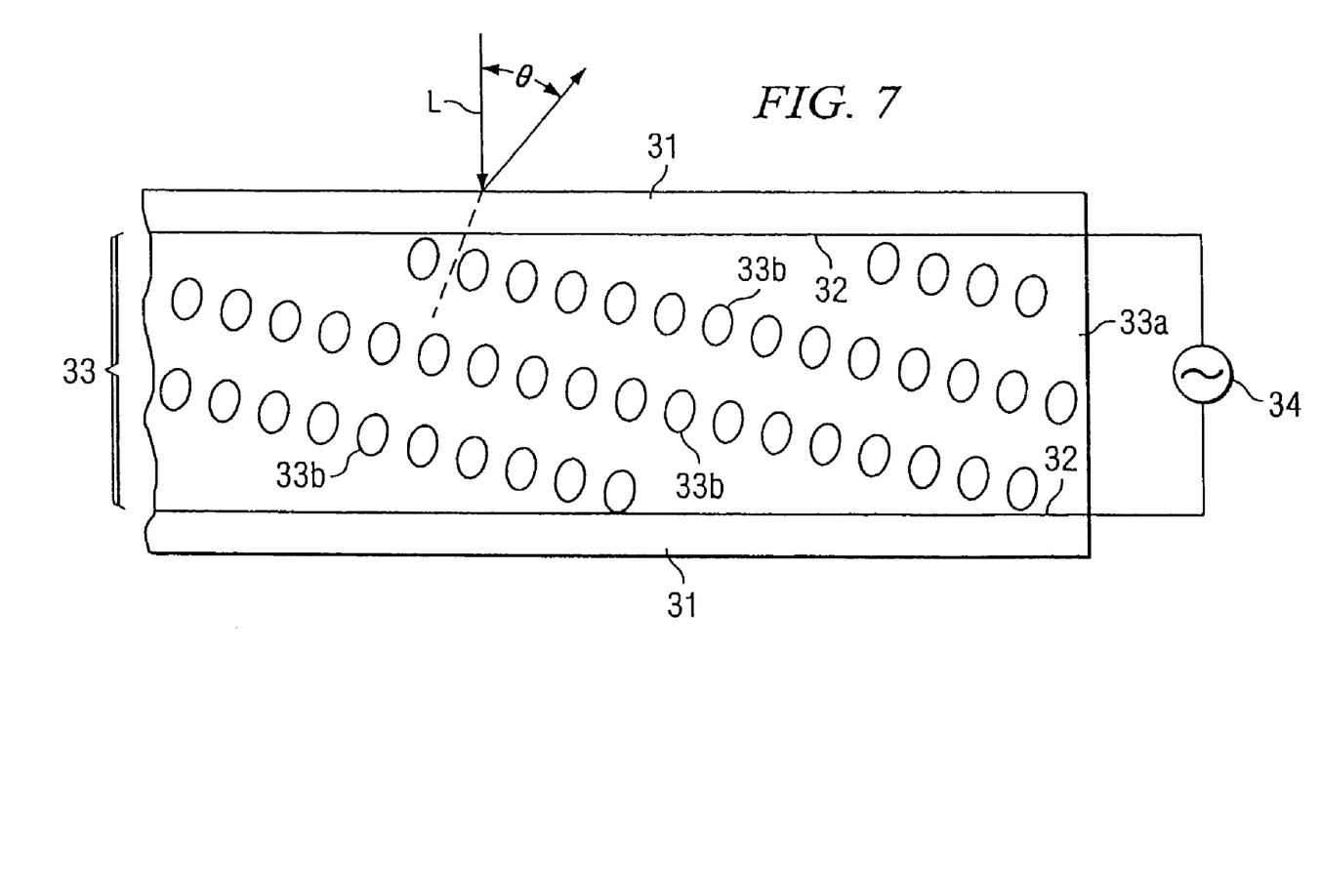
FIG. 7 is a sectional view schematically showing the structure of a liquid crystal hologram element.

FIG. 7 is a sectional view schematically showing the structure of each liquid crystal hologram element. As shown in this figure, the liquid crystal hologram element has a hologram 33 sandwiched between ITO films (transparent electrodes) 32 formed over the inner surfaces of a pair of glass substrates (or transparent film substrates) 31 arranged so as to face each other. The hologram 33 is produced by irradiating a liquid crystal polymer with two light beams that intersect each other on the liquid crystal polymer so as to form interference fringes thereon and then setting the liquid crystal polymer. Specifically, layers of a polymer 33a and layers containing clusters of liquid crystal molecules 33b in the form of minuscule droplets are alternately laid over one another, with those layers inclined with respect to the glass substrates 31.

In a normal state, the refractive index of the liquid crystal molecules 33b is higher than that of the polymer 33a. In this state, the hologram 33 reflects and diffracts light of a particular wavelength range and transmits light of other wavelength ranges. When an alternating-current or direct-current voltage from a voltage source 34 is applied between the ITO films 32 so as to produce an electric field in the hologram 33, the refractive index of the liquid crystal molecules 33b lowers and becomes substantially equal to that of the polymer 33a. In this state, the hologram 33 almost entirely loses its properties as a hologram, and functions substantially as a transparent plate.

Thus, by turning the voltage applied to the ITO films 32 on and off, it is possible to switch the hologram 33 at high speed between a state in which it functions as a hologram and a state in which it functions as a transparent plate. That is, by preparing different types of holograms 33 that act on light of different wavelength ranges (for example the wavelength ranges of R, G, and B colors) and laying the liquid crystal hologram elements having such different types of holograms 33 over one another, it is possible to reflect and diffract light of R, G, and B colors one after another on a time-divisional basis by switching on and off the individual liquid crystal hologram elements one after another at high speed.

Now, suppose that, with no voltage applied to the ITO films 32, S-polarized light L is incident to the surface of the glass substrate 31 from a direction substantially perpendicular thereto. The hologram 33 lets light of a particular wavelength range emit therefrom in a direction oblique to the surface of the glass substrate 31. The angle of emergence θ depends on the inclination of the layers of the polymer 33a and the layers of the liquid crystal molecules 33b that are laid on one another. In this embodiment, holograms that provide an angle of emergence θ of about 30 to 40 degrees are used.

Figure 8:
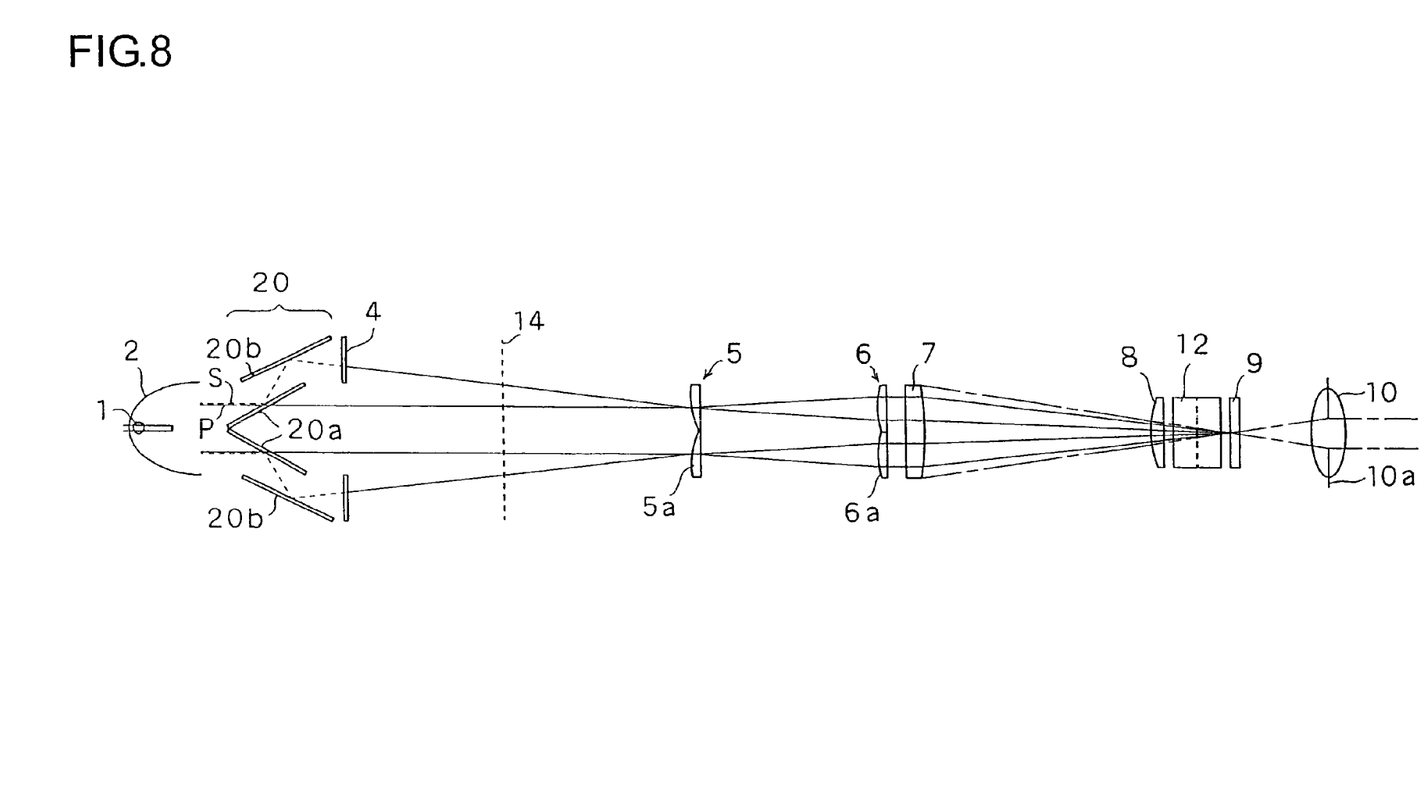
FIG. 8 is a diagram conceptually showing the construction of an optical display apparatus employing an optical illumination apparatus of a third embodiment of the invention.

FIG. 8 is a diagram conceptually showing the construction of an optical display apparatus employing an optical illumination apparatus of a third embodiment of the invention. In FIG. 8, reference numeral 1 represents a light source, and reference numeral 2 represents a reflector disposed so as to partially surround the light source 1. A set of polarization separation mirrors 20 are disposed immediately behind the reflector 2, i.e., on the right side thereof in FIG. 8. The set of polarization separation mirrors 20 splits the light from the light source 1 into two differently polarized types of light. Of the individual polarization separation mirrors 20a and 20b, those which let out S-polarized light have half-wave plates 4 disposed immediately behind them.

Behind the set of polarization separation mirrors 20 (i.e., on the right side thereof in FIG. 8) are disposed, in order of arrangement, a diffraction grating 14, a first lens array 5, a second lens array 6, and a superimposing lens 7 immediately behind it. Although not illustrated here, the light incident on the diffraction grating 14 is directed along a separately provided optical path so as to be subjected to color switching. How this is achieved will be described in detail later. The first lens array 5 has a plurality of lens cells 5a arranged in a rectangular, grid-like array, having an aspect ratio substantially identical to that of a display panel 9 to be described later. Similarly, the second lens array 6 also has a plurality of lens cells 6a arranged in a rectangular, grid-like array. However, the shape of the lens cells 6a is not necessarily geometrically similar to that of the lens cells 5a.

The diffraction grating 14, in combination with a reflective light valve to be described later, functions as one type of color switching device that electrically switches the color of illumination light on time-divisional basis from one color to another among R, G, and B colors. How this is achieved will be described in detail later. The images from the individual lens cells 5a of the first lens array 5 are, by the second lens array 6 and the superimposing lens 7 disposed immediately behind it, superimposed on one another in the vicinity of the focal point of the superimposing lens 7.

The components from the first lens array 5 through the superimposing lens 7 constitute an optical integrator system. A display panel 9 is disposed at the focal point of the superimposing lens 7. The display panel 9 is illuminated in a telecentric fashion by a condenser lens 8 disposed immediately in front of it. A PBS prism 12 is disposed between the condenser lens 8 and the display panel 9. Illumination light from the optical illumination apparatus is converted into projection light by the display panel 9 and transmitted, via the PBS prism 12, to the optical projection system 10. Projection light is considered to include the image information from the display panel 9.

The light emitted from the light source 1 is reflected from the reflector 2, and is thereby formed into a substantially parallel beam and directed to the polarization separation mirrors 20a of the set of polarization separation mirrors 20. Here, P-polarized light, indicated by solid lines P, is transmitted straight through the polarization separation mirrors 20a. On the other hand, S-polarized light, indicated by broken lines S, is reflected from the polarization separation mirrors 20a on which it is incident, directed to the outwardly contiguous polarization separation mirrors 20b, and is then reflected again from those polarization separation mirrors 20b. That is, by the set of polarization separation mirrors 20, the light from the light source 1 is split into two differently polarized types of light in the direction of the longer sides of the display panel 9 (i.e., in a vertical direction along the plane of the figure).

The S-polarized light exiting from the polarization separation mirrors 20b is converted into P-polarized light by the half-wave plates 4 disposed immediately behind the polarization separation mirrors 20b. That is, a portion of the light from the light source 1 has its polarization converted first by the set 20 of polarization separation mirrors and then by the half-wave plates 4, and eventually comes out as uniformly P-polarized light. This arrangement constitutes a polarization conversion device. Here, the type of light into which the light from the light source 1 is converted does not necessarily have to be P-polarized light, but can be of other polarizations.

The arrangement described thus far, starting with the light source 1 and ending immediately in front of the display panel 9, constitutes an optical illumination apparatus. As described previously, the light thus converted into uniformly P-polarized light then has its color switched by the function of the diffraction grating 14 and other components, passes through the above-mentioned optical integrator system, and eventually strikes the display panel 9. The display panel 9 modulates, pixel by pixel, the light it is illuminated with according to the display data of R, G, and B colors fed thereto, and emits the modulated light. The light thus emitted then enters an optical projection system 10. The display data presented on the display panel 9 is projected, as an image, onto a screen (not shown) through this optical projection system 10. Reference numeral 10*a* represents an aperture stop disposed in the optical projection system 10.

Figure 9:
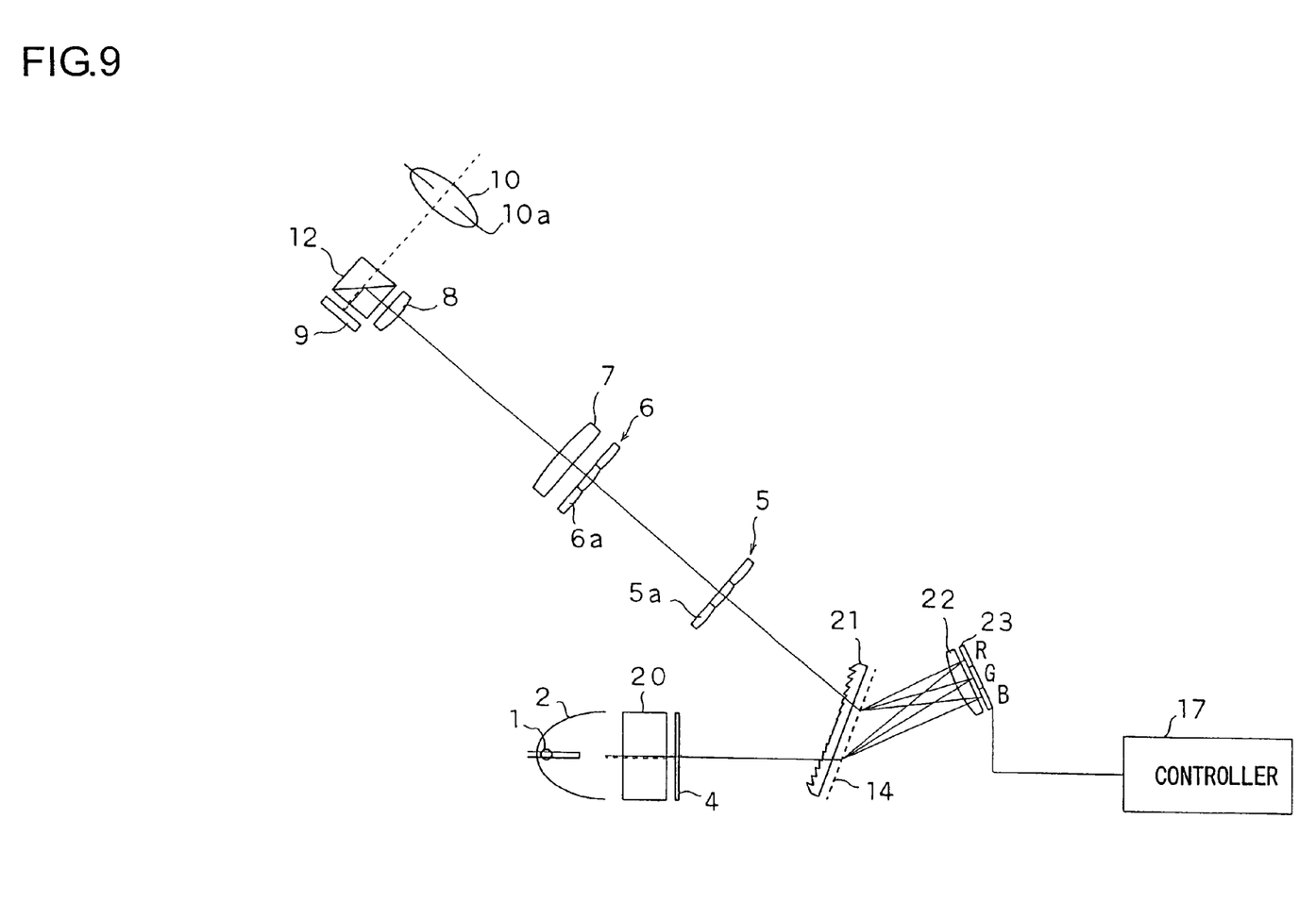
FIG. 9 is a diagram schematically showing an example of a practical construction of the optical display apparatus shown in FIG. 8.

FIG. 9 is a diagram schematically showing an example of a practical construction of the optical display apparatus shown in FIG. 8. While FIG. 8 illustrates a conceptual view wherein the optical system is formed along a straight line, an optical axis of the optical system is preferably bent at a reflecting surface as shown in FIG. 9.

With reference to FIG. 9, the paths of rays in this embodiment will be described once again below. The light emitted from the light source 1 is reflected from the reflector 2, and is thereby formed into a substantially parallel beam and directed to the set of polarization separation mirrors 20. The light has its polarization converted by this set of polarization separation mirrors 20 and the half-wave plates 4 disposed immediately behind it, and eventually comes out as uniformly P-polarized light. The light thus converted into uniformly P-polarized light then passes through a Fresnel lens 21 and then enters the diffraction grating 14. Here, instead of the Fresnel lens 21, it is also possible to use an ordinary lens.

The light that has passed through the Fresnel lens 21 and entered the diffraction grating 14 is preferably polarized in a direction perpendicular to the plane of the figure. The different wavelength ranges (i.e., the wavelength ranges of R, G, and B colors) contained in this light is diffracted at different angles relative to the plane of the figure (i.e., separated so as to travel in different directions), passes through a condenser lens 22, and then strikes different regions on a reflective light valve 23 that respectively correspond to the R, G, and B colors. Here, those regions are individually driven by a controller 17, shown as a block in FIG. 9, on a color-sequential basis in such a way as to be turned on and off one after another at a high speed. As a result, the light of R, G, and B colors is reflected one after another on a time-divisional basis.

The light exiting from the reflective light valve 23 after having its color switched then enters the diffraction grating 14 again so as to be integrated into light that travels in an identical direction, and then passes through the Fresnel lens 21 again. The light then passes through the above-mentioned optical integrator system, enters the PBS prism 12 as S-polarized light, and is then reflected inside it so as to strike the display panel 9. The display panel 9 is realized with, for example, a reflective liquid crystal display panel. The display panel 9 reflects, pixel by pixel, the light it is illuminated with by rotating (when "on") or not rotating (when "off") the polarization plane of the light according to the display data of R, G, and B colors fed thereto.

Here, the light reflected by the "off" pixels returns to the PBS prism 12, and, since this light is S-polarized light, it is reflected from the PBS prism 12 so as to be directed back to the light source 1. On the other hand, the light reflected by the "on" pixels, which has thereby been converted into P-polarized light, is transmitted through the PBS prism 12 so as to reach the optical projection system 10. The display data presented on the display panel 9 is projected, as an image, onto a screen (not shown) through this optical projection system 10.

Although the present invention has been fully described by way of examples and with reference to the accompanying drawings, it is to be understood that various changes and modifications will be apparent to those skilled in the art without departing from the spirit and scope of the invention. Therefore, unless such changes and modifications depart from the scope of the present invention, they should be construed as being included therein.

The invention claimed is:

1. An optical illumination apparatus comprising:
   a polarization conversion device for converting light from a light source into light uniformly polarized in a predetermined manner; and
   an optical integrator system for illuminating a display panel with the light polarized in the predetermined manner, the optical integrator system comprising a first lens array having a first lens cell, and a second lens array having a second lens cell;
   wherein the polarization conversion device is adapted to split the light from the light source into a first light beam and a second light beam such that the first and second light beams are polarized in different manners, and to convert one of the first and second light beams into light polarized in an identical manner as the other of the first and second light beams;
   wherein the first and second light beams, after being converted into light polarized in an identical manner, travel along paths at an angle relative to each other and are then integrated together at the position of the first lens array and wherein the first and second light beams pass through the first lens cell and are imaged on the second lens cell; and
   a color switching device disposed between the polarization conversion device and the optical integrator system, the color switching device adapted to time-divisionally switch colors of the light polarized in the predetermined manner from one color to another among a plurality of predetermined colors.

2. An optical illumination apparatus in accordance with claim 1, wherein the light from the light source is split into the first and second light beams in a direction corresponding to longer sides of the display panel.

3. An optical illumination apparatus in accordance with claim 1, wherein an optical relationship between the first and second light beams is represented by a formula:

$$0.3 < l \cdot \tan \theta / d < 0.75$$

wherein:
   θ represents an angle between the first and second light beams;
   l represents an optical distance between the first and second lens arrays; and d represents a size of each lens cell, along longer sides of the second lens array.

4. An optical illumination apparatus in accordance with claim 1, wherein the color switching device is a cholesteric liquid crystal device.

5. An optical illumination apparatus in accordance with claim 1, wherein the color switching device is a hologram device having a hologram formed of a liquid crystal polymer.

6. An optical illumination apparatus as in claim 5, wherein the hologram device comprises:
a layer of liquid crystal hologram elements; and
a controller for bringing the layer into a first state wherein light of a particular wavelength is reflected and diffracted, and into a transparent state wherein all light is transmitted through the layer,
wherein the light that is reflected and diffracted exits from the liquid hologram device in a direction oblique to its surface.

7. An optical illumination apparatus as in claim 6, wherein the layer of liquid crystal hologram elements includes:
a first liquid crystal hologram element that reflects and diffracts light in a first wavelength range;
a second liquid crystal hologram element that reflects and diffracts light in a second wavelength range; and
a third liquid crystal hologram element that reflects and diffracts light in a third wavelength range;
and wherein the controller switches, from one to another on a time-division basis, the wavelength ranges reflected by the first, second and third liquid crystal hologram elements.

8. An optical illumination apparatus as in claim 7 wherein the first, second and third liquid crystal hologram elements are laid one on top of another.

9. An optical illumination apparatus as in claim 6,
wherein the layer of liquid crystal hologram elements comprises:
glass substrates arranged so as to face each other, the glass substrates having transparent electrodes formed on surfaces thereof at which they face each other; and
the hologram formed of a liquid crystal polymer, the hologram being sandwiched between the transparent electrodes,
wherein the hologram is composed of layers of the polymer and layers containing clusters of liquid crystal molecules laid over one another alternately with an inclination relative to the glass substrates, and
wherein the controller applies a voltage to the hologram via the transparent electrodes.

10. An optical illumination apparatus in accordance with claim 1, wherein the color switching device comprises:
a diffraction grating; and
a reflective light valve.

11. An optical illumination apparatus in accordance with claim 1, wherein the first lens array comprises a plurality of lens cells, the first and second light beams form a first group, the polarization conversion device being adapted to further split the light from the light source into a second group such that the first and second groups travel in horizontally symmetric directions with respect to a direction in which an image is displayed, and individual lens cells of the first lens array are decentered in horizontally symmetric directions with respect to the direction in which the image is displayed.

12. An optical illumination apparatus in accordance with claim 1, wherein the polarization conversion device comprises a plurality of polarizing beam splitter prisms arranged in parallel.

13. An optical illumination apparatus in accordance with claim 1, wherein the polarization conversion device comprises:
a first polarizing beam splitter prism; and
a second polarizing beam splitter prism;
wherein the first polarizing beam splitter prism is adapted to transmit light polarized in a first manner and to reflect light polarized in a second manner to the second polarizing beam splitter prism; and
wherein the second polarizing beam splitter prism is adapted to reflect the light polarized in the second manner received from the first polarizing beam splitter prism.

14. An optical illumination apparatus in accordance with claim 1, wherein the first lens array comprises a plurality of the first lens cells arranged in a rectangular grid array.

15. An optical illumination apparatus in accordance with claim 14, wherein the rectangular grid array has an aspect ratio that is substantially identical to an aspect ratio of the display panel.

16. An optical illumination apparatus in accordance with claim 1, wherein the second lens array comprises a plurality of the second lens cells arranged in a rectangular grid array.

17. An optical illumination apparatus in accordance with claim 1, wherein the polarization conversion device comprises:
a first polarizing beam splitter prism adapted to transmit S-polarized light and to reflect P-polarized light;
a second polarizing beam splitter prism, adapted to reflect the P-polarized light received from the first polarizing beam splitter prism; and
a half-wave plate disposed behind the second polarizing beam splitter prism, adapted to convert the P-polarized light therefrom to S-polarized light.

18. An optical illumination apparatus in accordance with claim 1, wherein the color switching device comprises:
a layer of liquid crystal hologram elements; and
a controller for bringing the layer into a first state wherein light of a particular wavelength is reflected and diffracted, and into a transparent state wherein all light is transmitted through the layer;
wherein the light that is reflected and diffracted exits from the liquid crystal hologram device in a direction oblique to its surface.

19. An optical illumination apparatus as in claim 1, wherein an optical axis of the optical illumination apparatus is bent by the color switching device.

* * * * *